United States Patent
Hwang et al.

(10) Patent No.: US 10,725,501 B2
(45) Date of Patent: Jul. 28, 2020

(54) PROTECTIVE COVER AND DISPLAY DEVICE INCLUDING THE SAME

(71) Applicant: Samsung Display Co., Ltd., Yongin-si, Gyeonggi-do (KR)

(72) Inventors: Seong Jin Hwang, Yongin-si (KR); Myung Hwan Kim, Yongin-si (KR); Ji Yeon Kim, Yongin-si (KR); Ik Hyung Park, Yongin-si (KR); Dae Ho Yoon, Yongin-si (KR); Kyu Young Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 228 days.

(21) Appl. No.: 15/824,780

(22) Filed: Nov. 28, 2017

(65) Prior Publication Data

US 2018/0150105 A1 May 31, 2018

(30) Foreign Application Priority Data

Nov. 29, 2016 (KR) .......................... 10-2016-0160811

(51) Int. Cl.
*G06F 1/16* (2006.01)
*C03C 17/34* (2006.01)
(Continued)

(52) U.S. Cl.
CPC .......... *G06F 1/1637* (2013.01); *C03C 17/007* (2013.01); *C03C 17/3405* (2013.01);
(Continued)

(58) Field of Classification Search
CPC ........................... G06F 1/1637; C03C 17/3405
See application file for complete search history.

(56) References Cited

U.S. PATENT DOCUMENTS

2003/0168116 A1* 9/2003 Brenner ................. F01N 3/029
137/875
2012/0194974 A1* 8/2012 Weber ................... C03C 21/002
361/679.01
(Continued)

FOREIGN PATENT DOCUMENTS

JP 2014-203335 A 10/2014
KR 10-1321341 B1 10/2013
(Continued)

OTHER PUBLICATIONS

Hu et al., "Flexible integrated photonics: where materials, mechanics and optics meet [Invited]," Optical Materials Express, vol. 3, Issue 9, pp. 1313-1331, 2013.

(Continued)

*Primary Examiner* — Ian A Rummel
(74) *Attorney, Agent, or Firm* — Lewis Roca Rothgerber Christie LLP (57) ABSTRACT

A protective cover and a display device including a protective cover are provided. According to one or more embodiments, a protective cover includes a cover substrate; a first anti-scattering coating layer on the cover substrate; an intermediate layer on the first anti-scattering coating layer; a second anti-scattering coating layer on the intermediate layer; and an adhesive layer on the second anti-scattering coating layer, and the first anti-scattering coating layer and the second anti-scattering coating layer cover an upper surface, a lower surface, and at least one side surface of the intermediate layer.

18 Claims, 4 Drawing Sheets

(51) Int. Cl.
*C03C 17/00* (2006.01)
*C09J 7/10* (2018.01)
*C09J 7/29* (2018.01)

(52) U.S. Cl.
CPC . *C09J 7/10* (2018.01); *C09J 7/29* (2018.01); *C03C 2217/72* (2013.01); *C03C 2217/78* (2013.01); *C09J 2203/318* (2013.01)

(56) References Cited

U.S. PATENT DOCUMENTS

| | | | |
|---|---|---|---|
| 2014/0042406 A1* | 2/2014 | Degner | H01L 27/326 257/40 |
| 2015/0239211 A1* | 8/2015 | Yoon | C09J 4/00 428/41.8 |
| 2015/0266272 A1 | 9/2015 | Lee et al. | |
| 2018/0081088 A1 | 3/2018 | Hwang et al. | |

FOREIGN PATENT DOCUMENTS

| | | |
|---|---|---|
| KR | 10-1323600 B1 | 11/2013 |
| KR | 10-1484452 B1 | 2/2015 |
| KR | 10-2015-0051459 A | 5/2015 |
| KR | 10-2015-0108991 A | 10/2015 |
| KR | 10-2018-0032238 | 3/2018 |

OTHER PUBLICATIONS

Varshneya, "Chemical Strengthening of Glass: Lessons Learned and Yet to Be Learned," International Journal of Applied Glass Science, vol. 1, No. 2, pp. 131-142, 2010.

Tandon et al., "Controlling the Fragmentation Behavior of Stressed Glass," Fracture Mechanics of Ceramics, vol. 14, 2005, pp. 77-91.

Lee et al., "Glass Thickness and Fragmentation Behavior in Stressed Glasses," New Journal of Glass and Ceramics, 2012, 2, pp. 138-143.

* cited by examiner

PROTECTIVE COVER AND DISPLAY DEVICE INCLUDING THE SAME

CROSS-REFERENCE TO RELATED APPLICATION

This application claims priority to and the benefit of Korean Patent Application No. 10-2016-0160811, filed on Nov. 29, 2016 in the Korean Intellectual Property Office, the entire content of which is incorporated herein by reference.

BACKGROUND

1. Field

Aspects of embodiments of the present invention relate to a protective cover and a display device including the same.

2. Description of the Related Art

Recently, a flexible display device using a flat panel display has been developed.

The flat panel display generally includes a liquid crystal display (LCD), an organic light emitting diode (OLED), an electrophoretic display (EPD), and the like.

Since the flexible display devices have a bending and folding property, they may be folded or rolled, thereby enabling a large screen to be realized and being portable. These flexible display devices may be applied to various fields, such as not only mobile devices such as a mobile phone, a portable multimedia player (PMP), a navigation device, an ultra-mobile PC (UMPC), an electronic book, and an electronic newspaper, but also a TV and a monitor, for example.

SUMMARY

According to an aspect of embodiments of the present invention, a protective cover has excellent impact resistance and reliability, and a display device includes the same.

According to one or more exemplary embodiments of the present invention, a protective cover includes: a cover substrate; a first anti-scattering coating layer on the cover substrate; an intermediate layer on the first anti-scattering coating layer; a second anti-scattering coating layer on the intermediate layer; and an adhesive layer on the second anti-scattering coating layer, and the first anti-scattering coating layer and the second anti-scattering coating layer cover an upper surface, a lower surface, and at least one side surface of the intermediate layer.

According to an exemplary embodiment of the present invention, the intermediate layer has a smaller area than both the first anti-scattering coating layer and the second anti-scattering coating layer in a plane view.

According to an exemplary embodiment of the present invention, the intermediate layer extends along an edge of the protective cover.

According to an exemplary embodiment of the present invention, a thickness of the intermediate layer is less than a sum of thicknesses of the first anti-scattering coating layer and the second anti-scattering coating layer.

According to an exemplary embodiment of the present invention, a thickness of the second anti-scattering coating layer is equal to or greater than a thickness of the first anti-scattering coating layer.

According to an exemplary embodiment of the present invention, the cover substrate is flexible.

According to an exemplary embodiment of the present invention, the first anti-scattering coating layer and the second anti-scattering coating layer are made of different materials.

According to an exemplary embodiment of the present invention, each of the first anti-scattering coating layer and the second anti-scattering coating layer is made of at least one selected from the group consisting of an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and rubber.

According to an exemplary embodiment of the present invention, the cover substrate has a thickness of 10 μm to 150 μm.

According to an exemplary embodiment of the present invention, the cover substrate includes glass, and the glass includes an ion-exchanged chemical strengthening layer.

According to an exemplary embodiment of the present invention, when a pen of 5.7 g is dropped, a drop height of the pen at which the protective cover is broken is 8 cm or more.

According to an exemplary embodiment of the present invention, the intermediate layer includes a decorative layer imparting a pattern to the protective cover.

According to an exemplary embodiment of the present invention, the second anti-scattering coating layer is between the adhesive layer and the intermediate layer.

According to one or more exemplary embodiments of the present invention, a display device includes: a display panel to display an image; and a protective cover arranged on the display panel, wherein the protective cover includes a cover substrate; a first anti-scattering coating layer on the cover substrate; an intermediate layer on the first anti-scattering coating layer; a second anti-scattering coating layer on the intermediate layer; and an adhesive layer on the second anti-scattering coating layer, wherein the first anti-scattering coating layer and the second anti-scattering coating layer cover an upper surface, a lower surface, and at least one side surface of the intermediate layer.

According to an exemplary embodiment of the present invention, the display panel and the protective cover are flexible.

According to an exemplary embodiment of the present invention, the cover substrate has a thickness of 10 μm to 150 μm.

According to an exemplary embodiment of the present invention, the intermediate layer has a smaller area than both the first anti-scattering coating layer and the second anti-scattering coating layer in a plane view.

According to an exemplary embodiment of the present invention, the intermediate layer includes a decorative layer imparting a pattern to the protective cover.

According to an exemplary embodiment of the present invention, a protective cover has excellent durability and may secure a safety of a user. The protective cover may have flexibility, improve impact resistance, and prevent or substantially prevent scattering of glass.

However, the effects of the present invention are not limited to the above-described effects, and may be variously extended without departing from the spirit and scope of the present invention.

DESCRIPTION OF SYMBOLS

| | |
|---|---|
| 10: display device | 100: protective cover |
| 110: cover substrate | 121: first anti-scattering coating layer |
| 122: second anti-scattering coating layer | 123: intermediate layer |
| 130: adhesive layer | 200: display panel |

DETAILED DESCRIPTION

It will be apparent to those skilled in the art that various modifications and variations can be made in the present disclosure without departing from the spirit or scope of the disclosure, although some specific exemplary embodiments are exemplified in the drawings and explained in the description. Thus, it is intended that the present invention covers all modifications and variations that come within the scope of the present invention and their equivalents.

Like reference numerals designate like elements throughout the specification. In the accompanying drawings, dimensions of structures or layers may be exaggerated for clarity. The terms, "first," "second," and the like may be used for description of various constituent elements, but those meanings may not be limited to the restricted meanings. Rather, the above terms are used only for distinguishing one constituent element from other constituent elements. For example, a "first" constituent element may be referred to as a "second" constituent element, and, similarly, the "second" constituent element may be referred to as the "first" constituent element within the scope of the appended claims. When explaining the singular, unless explicitly described to the contrary, it may be interpreted as the plural meaning.

In the specification, the word "comprise" or "has" is used to specify existence of a feature, a number, a process, an operation, a constituent element, a part, or a combination thereof, and it will be understood that the existence or additional possibility of one or more other features or numbers, processes, operations, constituent elements, parts, or combinations thereof are not excluded. In addition, it will be understood that when an element, such as a layer, film, region, or substrate, is referred to as being "on" another element, it can be directly on the other element or one or more intervening elements may also be present. In the specification, it will be understood that when an element, such as a layer, film, region, or substrate, is referred to as being disposed "on" another element, the disposed direction is not limited to an upper direction and may include a side direction or a lower direction. Also, it will be understood that when an element, such as a layer, film, region, or substrate, is referred to as being "beneath" another element, it can be directly beneath the other element or one or more intervening elements may also be present.

In the present specification, the terms "upper side" and "lower side" are used in a relative sense in order to facilitate understanding of the present invention. Thus, the terms "upper side" and "lower side" do not necessarily refer to a particular direction, position, or element, and are interchangeable. For example, "upper side" may be interpreted as "lower side," and "lower side" may be interpreted as "upper side." Therefore, "upper side" may be expressed as "first side," "lower side" may be expressed as "second side," "lower side" may be expressed as "first side," and "upper side" may be expressed as "second side." However, in one or more exemplary embodiments, "upper side" and "lower side" may not be interchanged.

Figure 1:
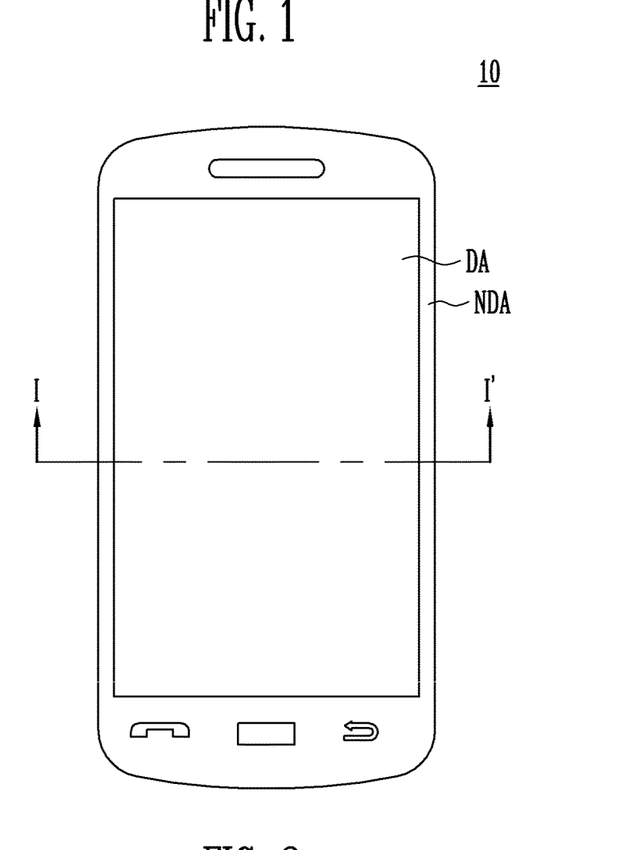
FIG. 1 is a plan view of a display device according to an exemplary embodiment of the present invention.

FIG. 1 is a plan view of a display device according to an exemplary embodiment of the present invention. FIG. 1 shows a display device 10 according to an exemplary embodiment of the present invention in a form of a smartphone. However, the form of the display device 10 shown in FIG. 1 is merely an example. Therefore, the display device 10 according to the present invention may be the form of a television, a notebook, a mobile phone, a smartphone, a smart pad, a PMP, a PDA, a navigation device, various wearable devices, such as a smart watch, and the like, for example.

Referring to FIG. 1, the display device 10 according to an exemplary embodiment of the present invention has a display region DA and a non-display region NDA. The display region DA is a region in which a plurality of pixels is disposed to display an image. The shape of the display region DA is shown as a rectangle in the embodiment of FIG. 1, but the shape of the display region DA is not limited thereto. For example, the display region DA may have any of various shapes, such as a closed polygon including a side made of a straight line, a circle, an ellipse, and the like, including a side made of a curved line, and a semicircle, a semi-ellipse, and the like, including a side made of a straight line and a curved line.

A pixel disposed in the display region DA is a minimum unit for displaying an image, and a plurality of pixels may be disposed in the display region DA. Each pixel may emit white light and/or color light. For example, each pixel can emit at least one of red color, green color, and blue color. However, the color which the pixel may emit is not limited to the above examples, and color such as cyan color, magenta color, and yellow color may also be emitted. In an embodiment, the pixel may be a light emitting device including an organic light emitting layer, but the present invention is not limited thereto, and may be implemented in various forms such as a liquid crystal device, an electrophoretic device, an electrowetting device, and the like, as long as the concept of the invention is maintained.

The non-display region NDA may be disposed in a region adjacent to the display region DA. Referring to FIG. 1, in an embodiment, the non-display region NDA is disposed along a boundary of the display region DA. However, the shape of the non-display region NDA is not limited to the example shown in FIG. 1. For example, the non-display region NDA may be disposed inside the display region DA, and may not be disposed in some regions of the display region DA. In an embodiment, no pixel is disposed in the non-display region NDA, and no image is displayed in the non-display region NDA. Various line units, a driver, and the like for driving the display device 10 may be disposed in the non-display region NDA.

Figure 2:
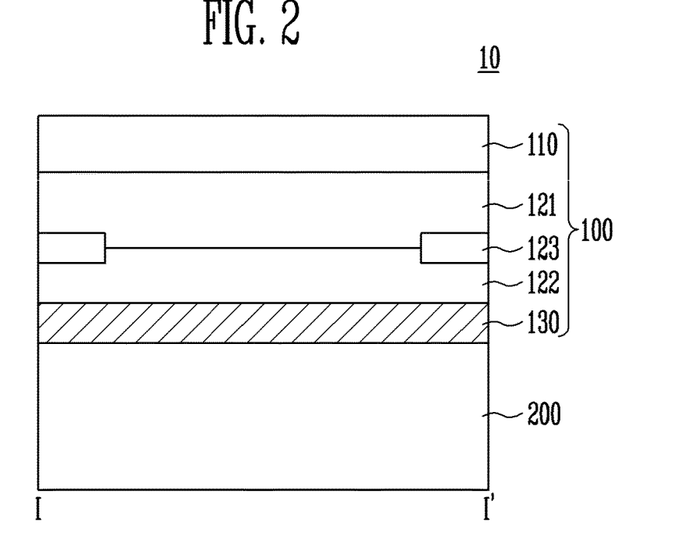
FIG. 2 is a cross-sectional view of the display device of FIG. 1 taken along the line I-I'.
Figure 3A:
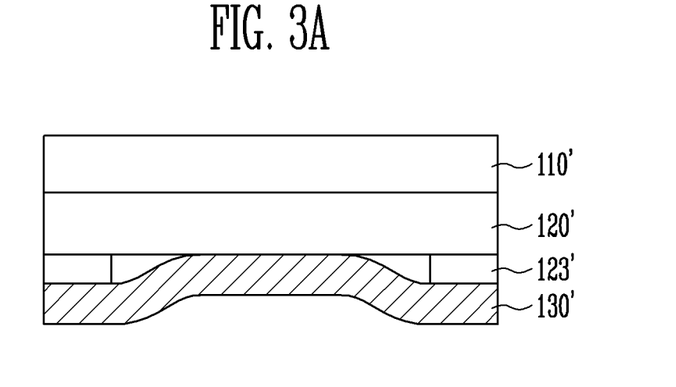
FIG. 3A is a cross-sectional view of a conventional protective cover.

FIG. 2 is cross-sectional view of the display device of FIG. 1 taken along the line I-I'. FIG. 3A is a cross-sectional view of a conventional protective cover, and FIGS. 3B to 3E are cross-sectional views of a protective cover according to some exemplary embodiments of the present invention. Herein, the display device 10 and a protective cover 100 according to the present invention will be described with reference to FIG. 2 and FIGS. 3B to 3E.

Referring to FIG. 2, the display device 10 according to an exemplary embodiment of the present invention includes a display panel 200 displaying an image and a protective cover 100 disposed on the display panel 200. In an embodiment, the protective cover 100 includes a cover substrate 110, a first anti-scattering coating layer 121 disposed on the cover substrate 110, an intermediate layer 123 disposed on the first anti-scattering coating layer 121, a second anti-scattering coating layer 122 disposed on the intermediate layer 123, and an adhesive layer 130 disposed on the second anti-scattering coating layer 122. Herein, each element included in the display device 10 will be described.

The protective cover 100 may protect the display device 10 from an external impact. The external impact may be an impact scratching the protective cover 100, a surface impact, or a point impact, for example. The point impact refers to an application of high pressure to a small area, and the surface impact refers to an application of high pressure to a relatively large area. For example, the point impact may occur when the display device 10 is pressed by a sharp object, such as a pen. The surface impact may occur when the display device 10 is pressed by a heavy object during a transportation process, for example. The protective cover 100 may be particularly susceptible to the point impact. For example, when the display device 10 is pressed by a sharp object, the protective cover 100 may be broken if the protective cover 100 is subjected to an impact which may not be withstood. Also, fragments generated by a breakage of the protective cover 100 may harm a user as well as the display device 10. Therefore, it is necessary to take measures to prevent or substantially prevent scattering of the fragments of the protective cover 100.

The protective cover 100 may have various shapes in a plane view. For example, the protective cover 100 may have a shape such as a rectangle, a square, a circle, an ellipse, a semicircle, a semi-ellipse, and the like.

The cover substrate 110 may form a skeleton of the protective cover 100. Accordingly, the cover substrate 110 may have a shape such as a rectangle, a square, a circle, an ellipse, a semicircle, a semi-ellipse, and the like, depending on the shape of the protective cover 100.

The cover substrate 110 may be made of at least one of glass, aluminosilicate, borosilicate, and boroaluminosilicate. However, a material of the cover substrate 110 is not limited to the above listed materials. In addition to the materials listed above, a material having good durability, surface smoothness, and transparency may be used as the cover substrate 110.

In an embodiment, the cover substrate 110 has flexibility and may have a thickness of about 10 µm to about 150 µm. When the thickness of the cover substrate 110 is greater than about 150 µm, the repulsive force against deformation becomes excessively large, such that the cover substrate 110 and the protective cover 100 may be difficult to bend. In addition, when the thickness of the cover substrate 110 is less than 10 µm, the cover substrate 110 has a low strength, such that the cover substrate 110 may be damaged. Here, "damaged" refers to a state in which the cover substrate 110 disclosed in the present invention may not be used for the intended purpose, such as being broken, flaws or cracks being formed, flaws or cracks being propagated, or being fractured.

In an embodiment, the cover substrate 110 having the above-described thickness may be formed by a slimming process. The slimming process is a process of reducing the thickness of the cover substrate 110 using a chemical or mechanical method. The slimming process may be performed on one side or both sides of a mother substrate of the cover substrate 110. When the chemical method is used, a sponge including an etching liquid may contact with the surface of the mother substrate of the cover substrate 110, or the etching liquid may be sprayed repeatedly in a predetermined region by using a spray.

As described above, the cover substrate 110 may have any of various shapes. Thus, the mother substrate of the slimmed cover substrate 110 may be shaped to implement any of a variety of shapes. In an embodiment, the shaping process may include cutting or chamfering.

In an embodiment, the cover substrate 110 may include glass, and the glass may include an ion-exchanged chemically strengthened layer. The chemically strengthened layer may be formed by performing a chemical strengthening treatment on an outer surface of the cover substrate 110. The chemical strengthening treatment may include an ion exchange process. The ion exchange process means that a cation disposed at or near a surface of glass at a temperature lower than a strain point of the cover substrate 110 is exchanged with another cation of the same valence. For example, alkali metal cations such as $Na^+$ and $Li^+$ inside the glass may be exchanged with cations such as $K^+$ by the ion exchange process. The ion exchange process may include the step of supporting the cover substrate 110 in an ion exchange salt and heating the supported cover substrate 110. The ion exchange salt includes ions to be exchanged with ions in the cover substrate 110. In an embodiment, the ions included in the ion exchange salt may be $K^+$, and ions in the cover substrate 110 to be exchanged may be $Na^+$ or $Li^+$. The ion exchange salt may be in a nitrate form. When the cover substrate 110 supported in the ion exchange salt is heated, the ions in the ion exchange salt diffuse through the surface of the cover substrate 110. The cover substrate 110 may be heated at about 370° C. to about 450° C. for about 1 hour to about 6 hours.

As the chemically strengthened layer is formed on the cover substrate 110, bending rigidity of the cover substrate 110 is decreased, and the cover substrate 110 and protective cover 100 may be bent or folded more easily. The chemically strengthened layer may provide a compressive stress profile extending from a surface of the cover substrate 110 to a specific position of the cover substrate 110.

The chemical strengthening treatment may be performed on one side or both sides of the cover substrate 110. In addition, the chemical strengthening treatment may be performed symmetrically or asymmetrically on front and back sides of the cover substrate 110. In an embodiment in which the cover substrate 110 is mainly folded in a specific direction, the chemical strengthening treatment may be performed asymmetrically. For example, in an embodiment in which the cover substrate 110 is mainly folded in only one direction, compressive stress may be applied to a surface in which both ends face each other, and tensile stress may be applied to a surface opposite to the surface. In an embodiment in which a type of stress mainly applied to both sides of the cover substrate 110 is different as described above, the chemical strengthening treatment may be performed asymmetrically.

A depth of the chemically strengthened layer may be from about 1 μm to about 15 μm. When the depth of the chemically strengthened layer is less than about 1 μm, the improvement of the strength by chemical strengthening treatment may be insignificant. In addition, when the depth of the chemically strengthened layer is greater than about 15 μm, the stress control of the cover substrate 110 may be difficult. When the chemical strengthening treatment is performed on both the front surface and the back surface of the cover substrate 110, the thickness of the chemically strengthened layer formed on the front surface and the thickness of the chemically strengthened layer formed on the back surface may be equal to or different from each other.

The cover substrate 110 having flexibility may be bent or folded as needed. In this case, the cover substrate 110 may have relatively small bending stiffness such that it may be bent or folded easily. The bending stiffness of the cover substrate 110 may be represented by the following Equation 1.

$$BS \propto E \times TH^3 \qquad \text{Equation 1}$$

In Equation 1, BS is a bending stiffness of each layer, E is an elastic modulus of each layer, and TH is a thickness of each layer. The bending stiffness of the cover substrate 110 is proportional to the cube of the thickness of the cover substrate 110. Therefore, in order for the cover substrate 110 to have a relatively small bending stiffness, the thickness of the cover substrate 110 should be relatively small.

As described above, in an exemplary embodiment of the present invention, the cover substrate 110 may have a thickness in a range of about 10 μm to about 150 μm. By having a thickness in this range, the cover substrate 110 according to the present invention has a relatively small bending stiffness and may be easily bent or folded.

When the cover substrate 110 is deformed by being bent or folded, a repulsive force is generated in the cover substrate 110. The repulsive force against the deformation of the cover substrate 110 may be represented by the following Equation 2.

$$F = \frac{wt}{6Y}\left(1.19814Y\frac{t}{D-t}\right) \qquad \text{Equation 2}$$

In Equation 2, Y is a Young's modulus, t is a thickness of the cover substrate 110, w is a width of the cover substrate 110, and D is a distance between both ends of the cover substrate 110 facing each other when folded. D may substantially correspond to twice a curvature radius of the cover substrate 110. In an embodiment, the cover substrate 110 may be set to have a curvature radius of about 1 mm to about 10 mm, and the curvature radius may satisfy the corresponding D. According to Equation 2, when other conditions are the same, the repulsive force in an embodiment in which the thickness of the cover substrate 110 is about 100 μm and D is about 10 mm is about three times the repulsive force in an embodiment in which the thickness of the cover substrate 110 is about 70 μm.

Therefore, when the protective cover 100 is bent, a large repulsive force may be applied to the cover substrate 110. In addition, when the thickness of the cover substrate 110 is reduced to reduce the repulsive force and the bending stiffness of the cover substrate 110, the cover substrate 110 may be vulnerable to an external impact.

The first and second anti-scattering coating layers 121 and 122 according to an exemplary embodiment of the present invention may complement insufficient impact resistance of the cover substrate 110. In addition, the first and second anti-scattering coating layers 121 and 122 may prevent or substantially prevent scattering of fragments when the cover substrate 110 is broken due to an external impact.

In an embodiment, the cover substrate 110, the first anti-scattering coating layer 121, and the second anti-scattering coating layer 122 according to an exemplary embodiment of the present invention may have a curvature radius of about 10 mm or less. The cover substrate 110 according to the present invention may not be broken even with the above curvature radius, and the first anti-scattering coating layer 121 and the cover substrate 110 may not be peeled off even with the curvature radius. In addition, the cover substrate 110, the first anti-scattering coating layer 121, and the second anti-scattering coating layer 122 according to the present invention may be folded with a curvature radius of about 10 mm or less even in a hot and humid environment (e.g., 60° C. temperature, 90% humidity) and a low temperature environment (e.g., −20° C. temperature). For example, the cover substrate 110, the first anti-scattering coating layer 121, and the second anti-scattering coating layer 122 may be folded with a curvature radius of about 1 mm to about 10 mm in the environment described above. Since the protective cover 100 has this flexibility, it may be applied to various display devices.

The first anti-scattering coating layer 121 and the second anti-scattering coating layer 122 may be disposed on the cover substrate 110. The first anti-scattering coating layer 121 and the second anti-scattering coating layer 122 may be disposed on the cover substrate 110 to improve impact resistance of the cover substrate 110. In addition, when the cover substrate 110 is broken by an external impact, the anti-scattering coating layer 110 can prevent or substantially prevent fragments of the cover substrate 110 from scattering. Therefore, according to the present invention, when the cover substrate 110 is broken, the user or the display device 10 is not damaged by the fragments of the cover substrate 110.

In an embodiment, each of the first anti-scattering coating layer 121 and the second anti-scattering coating layer 122 may include at least one selected from the group consisting of an epoxy acrylate resin, a polyester acrylate resin, a polyether acrylate resin, a urethane acrylate resin, an acryl acrylate resin, an unsaturated polyester, a urethane resin, an acrylonitrile butadiene styrene (ABS) resin, and rubber. The first anti-scattering coating layer 121 and the second anti-scattering coating layer 122 may further include fillers, such as glass beads, glass fibers, and silica, in addition to the compounds described above. The filler may be embedded in the first anti-scattering coating layer 121 and the second anti-scattering coating layer 122, thereby improving the impact resistance of the first anti-scattering coating layer 121 and the second anti-scattering coating layer 122. The filler may be randomly dispersed or may exist in a specific pattern inside the first anti-scattering coating layer 121 and the second anti-scattering coating layer 122.

Figure 3B:
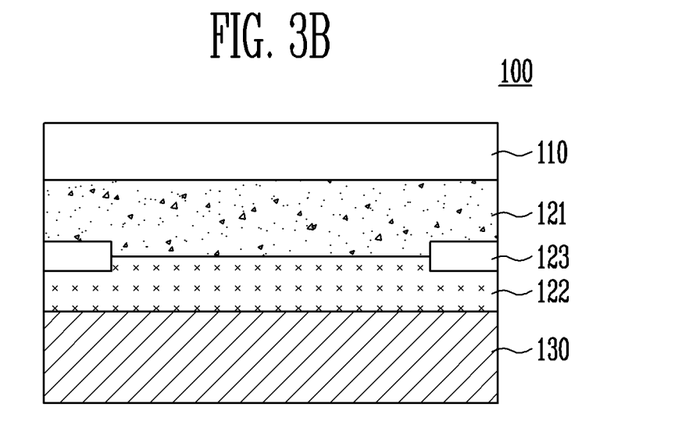
FIGS. 3B to 3E are cross-sectional views of a protective cover according to some exemplary embodiments of the present invention.

In an embodiment, as illustrated in FIG. 3B, the first anti-scattering coating layer 121 and the second anti-scattering coating layer 122 may be made of different materials. In this case, the first anti-scattering coating layer 121 and the second anti-scattering coating layer 122 may not be formed integrally, but may be formed sequentially. In an embodiment, the different materials may include not only a different kind of compound included in a respective coating liquid forming the first anti-scattering coating layer 121 and the second anti-scattering coating layer 122, but also the same kind of compound and a different composition ratio of compound.

Figure 3C:
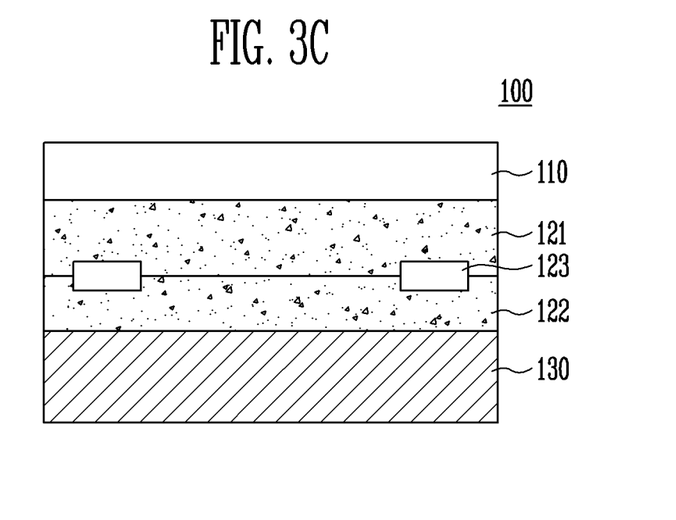

In an embodiment, as illustrated in FIG. 3C, the first anti-scattering coating layer 121 and the second anti-scattering coating layer 122 may be made of the same material. Even in this case, however, the first anti-scattering coating layer 121 and the second anti-scattering coating layer 122 may not be integrally formed. Therefore, even when the first anti-scattering coating layer 121 and the second anti-scattering coating layer 122 are formed of the same coating liquid, the first anti-scattering coating layer 121, an intermediate layer 123, and the second anti-scattering coating layer 122 may be sequentially formed as described later.

The material of the first anti-scattering coating layer 121 and the second anti-scattering coating layer 122 may be determined to the extent that the object of the present invention is satisfied. For example, to the extent that the scattering may be prevented and the impact resistance may be improved by the first and second anti-scattering coating layers 121 and 122, the material of the first anti-scattering coating layer 121 and the second anti-scattering coating layer 122 may be determined. In an embodiment in which the first anti-scattering coating layer 121 and the second anti-scattering coating layer 122 are made of different materials, the materials may be selected and combined so as to prevent or substantially prevent the scattering, improve the impact resistance and have an excellent interfacial property. In this case, the excellent interfacial property may be a good adhesion between the first anti-scattering coating layer 121 and the second anti-scattering coating layer 122 having different materials. In addition, when the first anti-scattering coating layer 121 and the second anti-scattering coating layer 122 are made of different materials, the materials of the first anti-scattering coating layer 121 and the second anti-scattering coating layer 122 may be selected such that each of the first anti-scattering and second anti-scattering coating layers 121 and 122 may be specialized for different functions. For example, the first anti-scattering coating layer 121 in contact with the cover substrate 110 may be formed of an excellent material in preventing or substantially preventing scattering, and the second anti-scattering coating layer 122 may be formed of an excellent material in impact resistance.

In an embodiment, the thickness of the second anti-scattering coating layer 122 may be equal to or greater than the thickness of the first anti-scattering coating layer 121. Herein, the thicknesses of the first anti-scattering coating layer 121 and the second anti-scattering coating layer 122 refer to the thickness of the thickest portion of the respective coating layer. The impact resistance of the protective cover 100 according to an exemplary embodiment of the present invention may be improved by increasing the thickness of the second anti-scattering coating layer 122. Since the second anti-scattering coating layer 122 contacts the adhesive layer 130, the second anti-scattering coating layer 122 may transfer the impact applied to the protective cover 100 to the adhesive layer 130 while the impact is dispersed inside the second anti-scattering coating layer 122 in the form of a shearing stress. The first anti-scattering coating layer 121 can disperse the impact applied to the protective cover 100, but there is a limit to increasing the thickness thereof. This is because when the thickness of the first anti-scattering coating layer 121 is increased to be equal to or greater than a certain thickness, the adhesive force between the first anti-scattering coating layer 121 and the cover substrate 110 which contact each other may be deteriorated. In this case, when the protective cover 100 is bent or warped, the first anti-scattering coating layer 121 and the cover substrate 110 may be peeled off. Therefore, not only to improve the impact resistance of the protective cover 100 but also to prevent or substantially prevent the cover substrate 110 and the first anti-scattering coating layer 121 from being peeled off, the thickness of the second anti-scattering coating layer 122 may be greater than the thickness of the first anti-scattering coating layer 121.

The adhesive layer 130 may be disposed on the second anti-scattering coating layer 122. The adhesive layer 130 may attach the protective cover 100 and other elements in the display device 10. In addition, the adhesive layer 130 may disperse a stress applied to the protective cover 100. The adhesive layer 130 may disperse compressive stress or tensile stress applied to the cover substrate 110 when the protective cover 100 is bent or warped. The compressive stress or tensile stress applied to the cover substrate 110 is transferred to the adhesive layer 130 in the form of shearing stress. The shearing stress may be dispersed by spreading along the adhesive layer 130 from a point of the impact. In addition, the adhesive layer 130 may disperse the impact that the protective cover 100 receives from the outside, in addition to the stress generated as the protective cover 100 is bent or warped.

In an embodiment, the adhesive layer 130 may have a predetermined adhesion, modulus, and creep property under a condition of a room temperature (25° C.) and 50% humidity to prevent or substantially prevent the protective cover 100 from being peeled off from the display device 10. In an embodiment, the adhesive layer 130 may have an adhesion of at least 500 gf/in and may have a storage modulus of from about 80 MPa to about 120 MPa under the above condition. In addition, the creep property of the adhesive layer 130 may be 50% to 800%.

A range of the storage modulus of the adhesive layer 130 is a range optimized to reduce the repulsive force due to the deformation of the display device 10. In addition, the creep property may be confirmed by measuring an initial deformation after pressing a constant force to the adhesive layer 130, and measuring a final deformation after maintaining the same force to the adhesive layer 130. The creep property may be calculated by an equation of (final deformation−initial deformation)/initial deformation.

In an embodiment, the adhesive layer 130 may include an optically clear adhesive (OCA), a pressure sensitive adhesive (PSA), or the like. Since an image output from the display device 10 is transmitted to the user through the adhesive layer 130, the adhesive layer 130 may be optically transparent. In an embodiment, each of the cover substrate 110, the first anti-scattering coating layer 121, the second anti-scattering coating layer 122, and the adhesive layer 130 may have a similar refractive index. In an embodiment, the refractive index of each of the cover substrate 110, the first anti-scattering coating layer 121, the second anti-scattering coating layer 122, and the adhesive layer 130 may have a difference of less than 0.3 from each other. Since the refractive indexes of the three layers are similar to each other, light transmitted through the protective cover 100 is relatively less refracted at an interface between the three layers. Therefore, even if an image incident from the lower side of the protective cover 100 passes through the protective cover 100, brightness of the image may not be lowered and the image may not be deformed by the refraction. In addition, since the refractive indexes of the three layers are similar to each other, scattering or reflection of light at an interface between the three layers is also reduced. As a result, the protective cover 100 may have a high transmittance. The protective cover 100 according to an exemplary embodiment of the present invention may have a transmittance of 90% or more.

The protective cover 100 according to an exemplary embodiment of the present invention may have excellent impact resistance. An impact resistance evaluation test of the protective cover 100 may be performed by stacking the protective cover 100 on the display panel 200 and dropping a pen of about 5.7 g onto the protective cover 100. In this test, the impact resistance may be evaluated by measuring a drop height of the pen at which the protective cover 100 is broken. Therefore, the greater the drop height of the pen is, the better the impact resistance of the protective cover 100 is. This drop test of the pen is particularly useful for evaluating resistance to a point impact. The point impact refers to application of high pressure to a small area. The point impact may occur when the protective cover 100 is pressed by a sharp object, such as a pen. The display panel 200 disposed under the protective cover 100 may be broken by the impact if the protective cover 100 cannot sufficiently absorb the point impact. In the impact resistance evaluation test, a plastic film may be used instead of the display panel 200. If the impact resistance evaluation test is performed using the actual display panel 200, the display panel 200 may be broken during the test, which causes an increase in a cost of the test. Therefore, the protective cover 100 may be stacked on the plastic film similar to the display panel 200, and the impact resistance evaluation test may proceed. For example, a polyethylene terephthalate (PET) film may be disposed at the position of the display panel 200. In the protective cover 100 according to an exemplary embodiment of the present invention, when the pen of 5.7 g is dropped, the drop height of the pen at which the protective cover 100 is broken may be 8 cm or more. The protective cover 100 satisfying the above condition has excellent impact resistance.

The intermediate layer 123 may be disposed on the first anti-scattering coating layer 121. In an embodiment, the intermediate layer 123 may be a decorative layer for imparting a pattern to the protective cover 100. Accordingly, the intermediate layer 123 may have a predetermined color. The intermediate layer 123 may have an opaque color, such as black, white, or metallic. The intermediate layer 123 may have an opaque color, such that the user cannot view a line unit, a driver, etc. disposed under the intermediate layer 123. The intermediate layer 123 may include an organic insulating material, such as a black resin, a white resin, and the like, or an opaque inorganic insulating material, such as chromium oxide (CrOx), molybdenum oxide (MoOx), and the like. In an embodiment, the intermediate layer 123 may reflect light incident on the intermediate layer 123, including a mirror silver ink, a pearl pigment, and an aluminum paste. By selecting the color and pattern of the intermediate layer 123, the protective cover 100 may have an aesthetic property. For example, in an embodiment in which the display device 10 is a smartphone, the intermediate layer 123 may be disposed in a bezel region of the smartphone. The intermediate layer 123 may determine the color and pattern of the bezel region of the smartphone, thereby providing aesthetics to the smartphone.

In an embodiment, the intermediate layer composition forming the intermediate layer 123 may include about 30% to about 90% by weight of a silicon-based polymer or fluorine-based polymer, about 5% to about 20% by weight of a pigment, and about 0.1% to about 5% by weight of other additives. In an embodiment, the intermediate layer 123 may include a silicon-based polymer or a fluorine-based polymer as a main chain polymer. In an embodiment, the silicon-based polymer may be at least one material selected from the group consisting of polymonomethylsiloxane, polydimethylsiloxane, and polytrimethylsiloxane, and the fluorine-based polymer may be at least one material selected from the group consisting of polytetrafluoroethylene and polyperfluoroalkene. However, the kind and composition ratio of the pigment in the intermediate layer composition may be selected depending on the color of the intermediate layer 123. For example, if the intermediate layer 123 is black, the pigment may be carbon black. In an embodiment, the intermediate layer composition may further include polyethylene oxide and/or polypropylene oxide as the other additives to improve the adhesion of the intermediate layer 123. In addition, the intermediate layer composition may further include an ultraviolet stabilizer as the other additives. The ultraviolet stabilizer may include at least one compound selected from the group consisting of benzotriazole, hydroxyphenyltriazine, cyanoacrylate, benzophenone, and hindered amine light stabilizers (HALS). Herein, the HALS may be at least one or a mixture thereof selected from the group consisting of commercialized Ciba™ Tinuvin®292, Ciba™ Tinuvin®328, Ciba™ Tinuvin®384, and Ciba™ Tinuvin®1130.

Figure 3D:
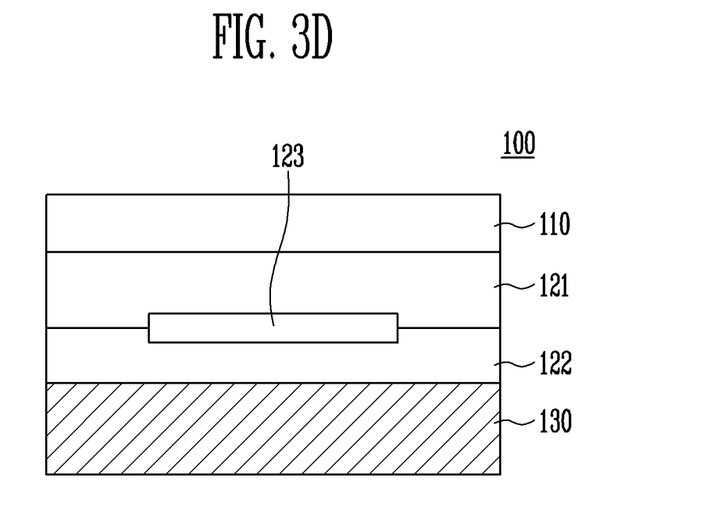
Figure 3E:
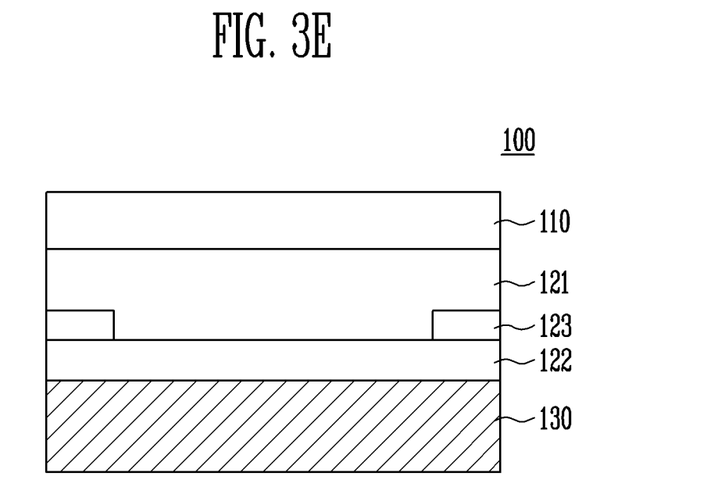

Referring to FIG. 2 and FIGS. 3B to 3E, the intermediate layer 123 is disposed between the first anti-scattering coating layer 121 and the second anti-scattering coating layer 122. Therefore, an upper surface, a lower surface, and at least one side surface of the intermediate layer 123 are covered by the first anti-scattering coating layer 121 and the second anti-scattering coating layer 122. Whether or not the side surface of the intermediate layer 123 is exposed depends on a position of the intermediate layer 123. For example, as shown in FIGS. 2 and 3B, only one side surface of the intermediate layer 123 is covered by the first anti-scattering coating layer 121 and the second anti-scattering coating layer 122, and the other side surface is exposed. However, as shown in FIGS. 3C and 3E, both side surfaces of the intermediate layer 123 are covered by the first anti-scattering coating layer 121 and the second anti-scattering coating layer 122. The shape of the surface of the first anti-scattering coating layer 121 and the surface of the second anti-scattering coating layer 122 may depend on the position of the intermediate layer 123. For example, in an embodiment, referring to FIG. 2 and FIGS. 3B to 3D, the intermediate layer 123 is disposed between the first anti-scattering coating layer 121 and the second anti-scattering coating layer 122, and there is a step on the surface of both the first and second anti-scattering coating layers 121 and 122. However, referring to FIG. 3E, in another embodiment, there is no step on the surface of the second anti-scattering coating layer 122, and there is a step only on the surface of the first anti-scattering coating layer 121.

In an embodiment, the intermediate layer 123 may be disposed on the non-display region NDA of the display device 10. Therefore, as described above, the intermediate layer 123 can prevent or substantially prevent the line unit, the driver, etc. disposed on the non-display region NDA from being viewed by a user. In an embodiment, the intermediate layer 123 may extend along an edge of the protective cover 100. Therefore, when the non-display region NDA is disposed along the edge of the display region DA, the region where the non-display region NDA and the intermediate layer 123 are disposed may coincide. Alternatively, the intermediate layer 123 may be disposed on the display region DA. Referring to FIG. 3D, in an embodiment, the intermediate layer 123 is disposed at a center of the protective cover 100 in a plane view. In this case, the intermediate layer 123 may be disposed on the display region DA.

The intermediate layer 123 may have a smaller area than the first anti-scattering coating layer 121 and the second anti-scattering coating layer 122 in a plan view. In an embodiment, when the intermediate layer 123 has an opaque color and is formed in the non-display region NDA of the display device 10, an area of the intermediate layer 123 may be somewhat smaller than an area of each of the first anti-scattering coating layer 121 and the second anti-scattering coating layer 122 to maximize or increase a size of the display region DA.

The intermediate layer 123 is shown as one layer in FIG. 2, but is not limited thereto, and, in another embodiment, a plurality of intermediate layers 123 may be provided or the intermediate layer 123 may include a plurality of layers.

A conventional protective cover is shown in FIG. 3A. Referring to FIG. 3A, a coating layer 120', an intermediate layer 123', and an adhesive layer 130' are sequentially provided on a cover substrate 110'. In this case, since the adhesive layer 130' contacts the coating layer 120' and the intermediate layer 123', there is a step on an adhesion surface of the adhesive layer 130' by the intermediate layer 123'. A size of the step increases as the thickness of the intermediate layer 123' increases. Bubbles may occur at a side of the intermediate layer 123' due to the step. Such bubbles occurring in the protective cover may significantly deteriorate a function of the protective cover. For example, due to the bubbles, the adhesive layer 130', the coating layer 120' and the intermediate layer 123' may be easily peeled off. In addition, the bubbles deteriorate the impact resistance and the transmittance of the protective cover. Therefore, it is important to prevent or substantially prevent bubbles from existing in the protective cover.

Referring to FIGS. 3B to 3E, in the protective cover 100 according to some exemplary embodiments of the present invention, there is no step on an adhesion surface of the adhesive layer 130. This is because the second anti-scattering coating layer 122 is disposed between the adhesive layer 130 and the intermediate layer 123. Therefore, there is no bubbling caused by a step on the adhesion surface of the adhesive layer 130. In addition, since the intermediate layer 123 is disposed between the first anti-scattering coating layer 121 and the second anti-scattering coating layer 122, the thickness of the intermediate layer 123 may be adjusted without concern for steps and bubbles. Therefore, in the protective cover 100 according to an exemplary embodiment of the present invention, the thickness of the intermediate layer 123 may be thicker than in the conventional protective cover. By increasing the thickness of the intermediate layer 123, the intermediate layer 123 may include a plurality of layers. In addition, by increasing the thickness of the intermediate layer 123, various functions may be provided to the intermediate layer 123. However, the thickness of the intermediate layer 123 may be smaller than the sum of the thicknesses of the first anti-scattering coating layer 121 and the second anti-scattering coating layer 122. Therefore, the intermediate layer 123 may be surrounded by the first anti-scattering coating layer 121 and the second anti-scattering coating layer 122.

The display device 10 according to the present invention may be implemented in various forms, such as an organic light emitting device, a liquid crystal device, an electrophoretic device, and an electrowetting device. When the display device 10 according to the present invention is an organic light emitting device, the display panel 200 may include a light emitting material. In addition, when the display device 10 according to the present invention is a liquid crystal device, the display panel 200 may include a liquid crystal molecule. In this case, the display device 10 according to the present invention requires a separate light source.

The display device according to an exemplary embodiment of the present invention may include pixels provided on a display region, a gate driver and a data driver for driving the pixels, and a timing controller for controlling driving of the gate driver and the data driver.

Each pixel may include a line unit which is provided on the display region and includes a gate line, a data line, and a driving voltage line, a thin film transistor which is connected to the line unit, an organic light emitting device which is connected to the thin film transistor, and a capacitor.

The gate line may extend in one direction. The data lines may extend in another direction crossing the gate line. The driving voltage line may extend in substantially the same direction as the data line. The gate line may transfer a gate signal to the thin film transistor, the data line may transfer a data signal to the thin film transistor, and the driving voltage line may provide a driving voltage to the thin film transistor.

The thin film transistor may include a driving thin film transistor for controlling the organic light emitting device, and a switching thin film transistor for switching the driving thin film transistor. However, the number of the thin film transistors is not limited thereto. One pixel may include one thin film transistor and one capacitor, or one pixel may include three or more thin film transistors and two or more capacitors.

A gate electrode of the switching thin film transistor may be connected to the gate line, and a source electrode of the switching thin film transistor may be connected to the data line. A drain electrode of the switching thin film transistor may be connected to the gate electrode of the driving thin film transistor. The switching thin film transistor may transfer a data signal applied to the data line to the driving thin film transistor based on a gate signal applied to the gate line.

A gate electrode of the driving thin film transistor may be connected to the drain electrode of the switching thin film transistor, the source electrode of the driving thin film transistor may be connected to the driving voltage line, and the drain electrode of the driving thin film transistor may be connected to the organic light emitting device.

The organic light emitting device includes a light emitting layer, and a cathode and an anode opposite to each other with the light emitting layer interposed therebetween. The cathode is connected to the drain electrode of the driving thin film transistor. A common voltage is applied to the anode, and the light emitting layer emits or does not emit light according to the output signal of the driving thin film transistor, to thereby display an image. Herein, the light emitted from the light emitting layer may be white light or color light.

The capacitor may be connected between the gate electrode and the second source electrode of the driving thin film transistor, and may charge and hold the data signal input to the gate electrode of the driving thin film transistor.

In an embodiment, the timing controller receives a plurality of video signals and a plurality of control signals from the outside of the display device. The timing controller converts a data format of the video signals according to an interface specification with the data driver, and provides the converted video signals to the data driver. In addition, the timing controller generates a data control signal (e.g., an output start signal, a horizontal start signal, and the like) and a gate control signal (e.g., a vertical start signal, a vertical clock signal, and a vertical clock bar signal) based on a plurality of control signals. The data control signal is provided to the data driver, and the gate control signal is provided to the gate driver.

In an embodiment, the gate driver sequentially outputs the gate signal in response to the gate control signal provided from the timing controller. Therefore, a plurality of pixels may be sequentially scanned line by line by the gate signal.

The data driver converts the video signals into data signals in response to a data control signal provided from the timing controller. The output data signals are applied to the pixels.

Therefore, each pixel is turned on by the gate signal, and the turned-on pixel receives a corresponding data voltage from the data driver, thereby displaying an image of the desired gray level.

Figure 4A:
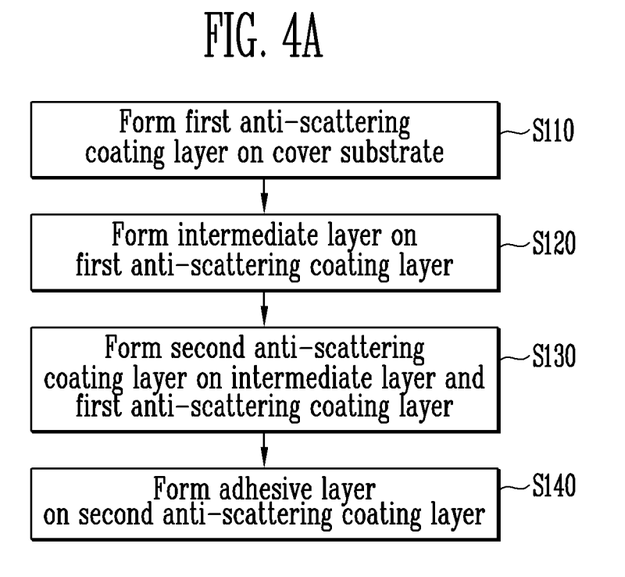
FIG. 4A is a flowchart illustrating a manufacturing method of a protective cover according to an exemplary embodiment of the present invention.
Figure 4B:
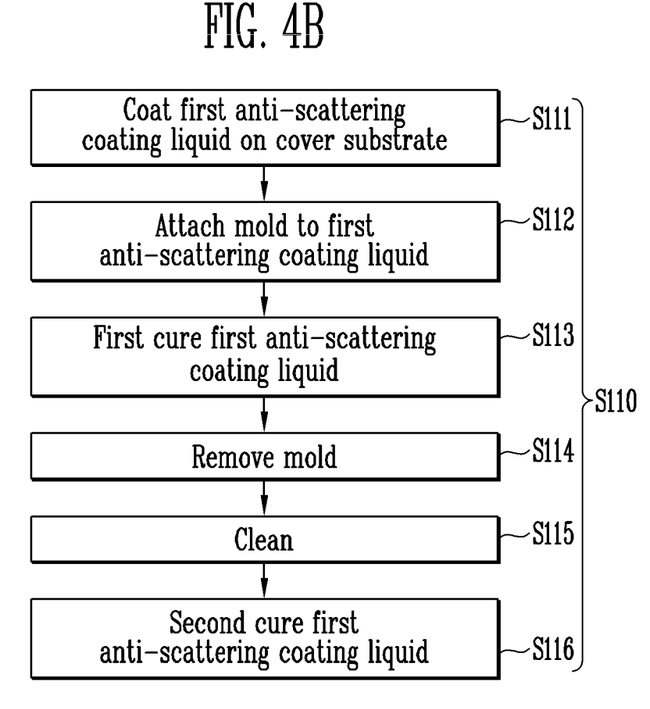
FIG. 4B is a flowchart illustrating a forming method of a first anti-scattering coating layer of the method of FIG. 4A, according to an exemplary embodiment of the present invention.

FIG. 4A is a flowchart illustrating a manufacturing method of a protective cover according to an exemplary embodiment of the present invention; and FIG. 4B is a flowchart illustrating a forming method of a first anti-scattering coating layer of the method of FIG. 4A, according to an exemplary embodiment of the present invention.

According to an exemplary embodiment of the present invention, first, a first anti-scattering coating layer is formed on a prepared cover substrate (S110). In an embodiment, the first anti-scattering coating layer may be formed on the cover substrate using any of processes such as slip coating, bar coating, spin coating, and the like. However, according to an exemplary embodiment of the present invention, the first anti-scattering coating layer may be formed on the cover substrate using Glass Direct Molding. The Glass Direct Molding is particularly useful in an embodiment in which the cover substrate is glass. When a coating layer is formed on glass, a low adhesion between the glass and the coating layer may be a problem. This is because the glass and the coating layer may be easily peeled off when the adhesion between the glass and the coating layer is low. Therefore, a separate adhesive layer may be required to attach the glass and the coating layer. However, according to the Glass Direct Molding, the first anti-scattering coating layer may be formed on the cover substrate made of glass without a separate adhesive layer. FIG. 4B shows tasks of a method of forming a first anti-scattering coating layer on the cover substrate using the Glass Direct Molding.

Referring to FIG. 4B, first, the first anti-scattering coating liquid is coated on the cover substrate (S111). At this time, the first anti-scattering coating liquid may be in a viscous solution state. The first anti-scattering coating liquid may be coated thicker than a predetermined thickness of the first anti-scattering coating layer in consideration of the following steps of attaching a mold (S112), curing a coating liquid (S113, S116) and cleaning (S115).

Next, the mold is attached to the coated first anti-scattering coating liquid (S112). In an embodiment, the mold may be a soft mold. In addition, the mold may be translucent. Therefore, in the following first curing step (S113), an ultraviolet ray may transmit through the mold and cure the first anti-scattering coating liquid under the mold. In an embodiment, the mold may include a concave portion or a convex portion. A pattern may be imparted to the first anti-scattering coating layer according to a shape of the concave portion or the convex portion of the mold.

Next, the first anti-scattering coating liquid is first cured while the mold is attached to the first anti-scattering coating liquid (S113). The curing method is not limited. Therefore, depending on the type of the first anti-scattering coating liquid, thermal curing or ultraviolet curing may be performed. In this case, when the ultraviolet curing is used, the mold may be translucent as described above. In an embodiment, the mold may have a translucent region and an opaque region. Accordingly, only the first anti-scattering coating liquid in the translucent region may be cured in the first curing step (S113). After the first curing step (S113), the first anti-scattering coating liquid may have the semi-cured region and the uncured region together.

Next, the mold attached to the first anti-scattering coating liquid is removed (S114), and the first anti-scattering coating liquid is cleaned (S115). By the cleaning step (S115), the uncured coating liquid in the applied anti-scattering coating liquid may be removed from the cover substrate. A cleaning agent used in the cleaning step (S115) is not limited. Therefore, the cleaning step (S115) may be performed by selecting an appropriate cleaning agent according to the type of the first anti-scattering coating liquid.

Next, a semi-cured first anti-scattering coating liquid that remains after the cleaning step (115) is second cured (S116). The first anti-scattering coating liquid semi-cured by the second curing step is completely cured, and the first anti-scattering coating layer may be formed. The second curing step may also be performed using thermal curing, ultraviolet curing, and the like.

Referring to FIG. 4A, an intermediate layer may be formed on the first anti-scattering coating layer (S120). The intermediate layer may be formed by coating a solution directly on the first anti-scattering coating layer and curing a coated solution. Alternatively, the intermediate layer may be manufactured in the form of a film in a separate process and then attached on the first anti-scattering coating layer. An intermediate layer may be formed on the first anti-scattering coating layer by using an appropriate method in consideration of a property of the intermediate layer and the first anti-scattering coating layer.

A second anti-scattering coating layer may be formed on the intermediate layer and the first anti-scattering coating layer (S130). In an embodiment, the second anti-scattering coating layer may be formed on the first anti-scattering coating layer using any of processes such as slip coating, bar coating, spin coating, Glass Direct Molding, and the like.

An adhesive layer may be formed on the second anti-scattering coating layer (S140). The adhesive layer may be formed by coating an adhesive solution directly on the second anti-scattering coating layer, or by attaching a form of a film manufactured in a separate process. However, in addition to the method described above, the adhesive layer may be formed on the second anti-scattering coating layer by using any of various methods.

Herein, the present invention will be described in more detail through some experimental results. The following exemplary embodiments are not used to limit the scope of the present invention, but are merely used to explain the present invention.

Tables 1 to 3 show results of an impact resistance evaluation, a bubble occurrence evaluation, and a flexibility evaluation of the protective cover according to Examples and Comparative Examples.

The impact resistance evaluation is obtained by a breakage height at which the protective cover or display panel is broken when a pen of about 5.7 g is dropped onto the protective cover stacked on the display panel, as described above. In a test for the impact resistance evaluation, a polyethylene terephthalate (PET) film having a thickness of about 50 μm was used instead of the display panel. A chemically strengthened glass having a thickness of about 70 μm was used as the cover substrate.

The bubble occurrence evaluation is obtained by checking whether bubbles exist inside the protective cover in a flat state at room temperature (i.e. in a general environment), and by checking whether bubbles exist inside the protective cover when the protective cover is bent in each of a high temperature and high humidity (60° C. temperature, 90% humidity) and a low temperature (−20° C. temperature) (i.e. in a trusted environment).

The flexibility evaluation is obtained by checking whether the cover substrate is broken and whether the lower layer of the cover substrate is peeled off when the protective cover is bent with a curvature radius of 4.5 cm.

TABLE 1

| | Thickness | | | Impact resistance evaluation | | Bubble occurance evaluation | | Flexibility evaluation | |
|---|---|---|---|---|---|---|---|---|---|
| | First anti-scattering coating layer | Intermediate layer | Second anti-scattering coating layer | Region without intermediate layer | Region with intermediate layer | General environment | Trusted environment | Damage | Peeling |
| Comparative Example 1 | 0 μm | 10 μm | 0 μm | 5 cm | 5 cm | No | Yes | Damaged | Peeled |
| Comparative Example 2 | 0 μm | 10 μm | 13 μm | 9 cm | 8 cm | No | Yes | Damaged | No peeling |
| Example 1 | 5 μm | 10 μm | 13 μm | 13 cm | 10 cm | No | No | No damage | No peeling |
| Example 2 | 5 μm | 10 μm | 15 μm | 10 cm | 10 cm | No | No | No damage | No peeling |
| Example 3 | 10 μm | 10 μm | 13 μm | 9 cm | 10 cm | No | No | No damage | No peeling |
| Example 4 | 10 μm | 10 μm | 15 μm | 9 cm | 12 cm | No | No | No damage | No peeling |

TABLE 2

| | Thickness | | | Impact resistance evaluation | | Bubble occurance evaluation | | Flexibility evaluation | |
|---|---|---|---|---|---|---|---|---|---|
| | First anti-scattering coating layer | Intermediate layer | Second anti-scattering coating layer | Region without intermediate layer | Region with intermediate layer | General environment | Trusted environment | Damage | Peeling |
| Comparative Example 3 | 0 μm | 20 μm | 0 μm | 5 cm | 5 cm | Yes | Yes | Damage | Peeling |
| Comparative Example 4 | 0 μm | 20 μm | 23 μm | 9 cm | 10 cm | No | Yes | Damage | No peeling |
| Example 5 | 5 μm | 20 μm | 23 μm | 8 cm | 9 cm | No | No | No damage | No peeling |
| Example 6 | 5 μm | 20 μm | 25 μm | 9 cm | 8 cm | No | No | No damage | No peeling |
| Example 7 | 10 μm | 20 μm | 23 μm | 8 cm | 10 cm | No | No | No damage | No peeling |
| Example 8 | 10 μm | 20 μm | 25 μm | 8 cm | 10 cm | No | No | No damage | No peeling |

TABLE 3

| | Thickness | | | Impact resistance evaluation | | Bubble occurance evaluation | | Flexibility evaluation | |
|---|---|---|---|---|---|---|---|---|---|
| | First anti-scattering coating layer | Intermediate layer | Second anti-scattering coating layer | Region without intermediate layer | Region with intermediate layer | General environment | Trusted environment | Damage | Peeling |
| Comparative Example 5 | 0 μm | 30 μm | 0 μm | 5 cm | 5 cm | Yes | Yes | Damage | Peeling |
| Comparative Example 6 | 0 μm | 30 μm | 33 μm | 8 cm | 8 cm | No | Yes | No damage | No peeling |

TABLE 3-continued

| | Thickness | | | Impact resistance evaluation | | Bubble occurance evaluation | | Flexibility evaluation | |
|---|---|---|---|---|---|---|---|---|---|
| | First anti-scattering coating layer | Intermediate layer | Second anti-scattering coating layer | Region without intermediate layer | Region with intermediate layer | General environment | Trusted environment | Damage | Peeling |
| Comparative Example 7 | 5 μm | 30 μm | 35 μm | 7 cm | 7 cm | No | No evaluation due to flexibility defects | No damage | Peeling |
| Comparative Example 8 | 10 μm | 30 μm | 33 μm | 8 cm | 7 cm | No | No evaluation due to flexibility defects | No damage | Peeling |
| Comparative Example 9 | 10 μm | 30 μm | 35 μm | 7 cm | 7 cm | No | No evaluation due to flexibility defects | No damage | Peeling |
| Comparative Example 10 | 5 μm | 50 μm | 55 μm | 6 cm | 6 cm | No | No evaluation due to flexibility defects | No damage | Peeling |
| Example 9 | 5 μm | 30 μm | 33 μm | 8 cm | 8 cm | No | No | No damage | No peeling |

Referring to Tables 1 to 3, when the first anti-scattering coating layer or the second anti-scattering coating layer is not provided, the impact resistance and/or flexibility may be deteriorated, and the possibility of bubbles in the protective cover is high.

First, in the impact resistance evaluation, it may be confirmed that the protective cover in which neither the first anti-scattering coating layer nor the second anti-scattering coating layer is provided has significantly deteriorated impact resistance. In addition, it is generally confirmed that the impact resistance of the protective cover increases as the thickness of the first anti-scattering coating layer or the second anti-scattering coating layer increases. This is because the impact applied to the protective cover may be dispersed inside the first and second anti-scattering coating layers as described above. The difference in the impact resistance between the region with the intermediate layer and the region without the intermediate layer was not significant.

In the bubble occurrence evaluation, it may be confirmed that bubbles occur when there is a step on an adhesion surface of the adhesive layer due to an absence of the second anti-scattering coating layer.

In addition, in Comparative Examples 7 to 10, it may be confirmed that the flexibility of the protective cover deteriorates when the sum of the thicknesses of the first anti-scattering coating layer and the second anti-scattering layer is too large.

The protective cover according to an exemplary embodiment of the present invention may be applied to any of various electronic devices. For example, the protective cover may be applied to a television, a notebook, a mobile phone, a smartphone, a smart pad, a PMP, a PDA, a navigation device, various wearable devices, such as a smart watch, and the like.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A protective cover comprising:
   a cover substrate;
   a first anti-scattering coating layer on the cover substrate;
   an intermediate layer on the first anti-scattering coating layer;
   a second anti-scattering coating layer on the intermediate layer; and
   an adhesive layer on the second anti-scattering coating layer,
   wherein the first anti-scattering coating layer and the second anti-scattering coating layer cover an upper surface, a lower surface, and a side surface of the intermediate layer, and
   wherein a region of the side surface of the intermediate layer not covered by the first anti-scattering coating layer is covered by the second anti-scattering coating layer.

2. The protective cover of claim 1, wherein the intermediate layer has a smaller area than both the first anti-scattering coating layer and the second anti-scattering coating layer in a plane view.

3. The protective cover of claim 1, wherein the intermediate layer extends along an edge of the protective cover.

4. The protective cover of claim 1, wherein a thickness of the intermediate layer is less than a sum of thicknesses of the first anti-scattering coating layer and the second anti-scattering coating layer.

5. The protective cover of claim 1, wherein a thickness of the second anti-scattering coating layer is equal to or greater than a thickness of the first anti-scattering coating layer.

6. The protective cover of claim 1, wherein the cover substrate is flexible.

7. The protective cover of claim 1, wherein the first anti-scattering coating layer and the second anti-scattering coating layer are made of different materials.

8. The protective cover of claim 1, wherein each of the first anti-scattering coating layer and the second anti-scattering coating layer is made of at least one selected from the group consisting of an epoxy acrylate resin, a polyester acrylate resin, a polyether acrylate resin, a urethane acrylate resin, an acryl acrylate resin, an unsaturated polyester, a urethane resin, an acrylonitrile butadiene styrene resin, and rubber.

9. The protective cover of claim 1, wherein the cover substrate has a thickness of about 10 μm to about 150 μm.

10. The protective cover of claim 1, wherein the cover substrate comprises glass, and the glass comprises an ion-exchanged chemical strengthening layer.

11. The protective cover of claim 1, wherein, when a pen of about 5.7 g is dropped, a drop height of the pen at which the protective cover is broken is about 8 cm or more.

12. The protective cover of claim 1, wherein the intermediate layer comprises a decorative layer imparting a pattern to the protective cover.

13. The protective cover of claim 1, wherein the second anti-scattering coating layer is between the adhesive layer and the intermediate layer.

14. A display device comprising:
a display panel to display an image; and
a protective cover arranged on the display panel,
wherein the protective cover comprises:
a cover substrate;
a first anti-scattering coating layer on the cover substrate;
an intermediate layer on the first anti-scattering coating layer;
a second anti-scattering coating layer on the intermediate layer; and
an adhesive layer on the second anti-scattering coating layer,
wherein the first anti-scattering coating layer and the second anti-scattering coating layer cover an upper surface, a lower surface, and a side surface of the intermediate layer, and
wherein a region of the side surface of the intermediate layer not covered by the first anti-scattering coating layer is covered by the second anti-scattering coating layer.

15. The display device of claim 14, wherein the display panel and the protective cover are flexible.

16. The display device of claim 14, wherein the cover substrate has a thickness of about 10 μm to about 150 μm.

17. The display device of claim 14, wherein the intermediate layer has a smaller area than both the first anti-scattering coating layer and the second anti-scattering coating layer in a plane view.

18. The display device of claim 14, wherein the intermediate layer comprises a decorative layer imparting a pattern to the protective cover.

* * * * *